(12) United States Patent
Dignum et al.

(10) Patent No.: US 7,647,444 B2
(45) Date of Patent: Jan. 12, 2010

(54) METHOD AND APPARATUS FOR DYNAMIC HARDWARE ARBITRATION

(75) Inventors: Marcelino M. Dignum, Menlo Park, CA (US); Rahoul Puri, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 203 days.

(21) Appl. No.: 11/685,516

(22) Filed: Mar. 13, 2007

(65) Prior Publication Data
US 2008/0228977 A1    Sep. 18, 2008

(51) Int. Cl.
*G06F 12/00* (2006.01)
(52) U.S. Cl. ................................. 710/241; 370/230
(58) Field of Classification Search ......... 710/240–244; 370/230
See application file for complete search history.

(56) References Cited

U.S. PATENT DOCUMENTS 6,880,028 B2 * 4/2005 Kurth ..................... 710/240
7,362,702 B2 * 4/2008 Terrell et al. .............. 370/230

* cited by examiner

*Primary Examiner*—Clifford H Knoll
(74) *Attorney, Agent, or Firm*—Park, Vaughan & Fleming LLP

(57) ABSTRACT

A method and apparatus for dynamically arbitrating, in hardware, requests for a resource shared among multiple clients. Multiple data streams or service requests require access to a shared resource, such as memory, communication bandwidth, etc. A hardware arbiter monitors the streams' traffic levels and determines when one or more of their arbitration weights should be adjusted. When a queue used by one of the streams is filled to a threshold level, the hardware reacts by quickly and dynamically modifying that queue's arbitration weight. Therefore, as the queue is filled or emptied to different thresholds, the queue's arbitration weight rapidly changes to accommodate the corresponding client's temporal behavior. The arbiter may also consider other factors, such as the client's type of traffic, a desired quality of service, available credits, available descriptors, etc.

15 Claims, 4 Drawing Sheets

US 7,647,444 B2

METHOD AND APPARATUS FOR DYNAMIC HARDWARE ARBITRATION

BACKGROUND

This invention relates to the field of computer systems. More particularly, a method and apparatus are provided for dynamic, hardware-based arbitration.

Arbitration is employed in computer systems to facilitate fair access to a shared resource among competing consumers. For example, a memory controller may employ arbitration to allow access to shared memory. Or, a network interface (e.g., a network interface circuit or card) may arbitrate between multiple communication streams to enable access to a communication link.

Existing arbitration algorithms, such as round robin and deficit round robin, generally employ fixed arbitration weights or a fixed number of credits. Other arbitration schemes may employ programmable arbitration weights, but rely upon software to monitor the arbitration process, determine when a weight needs to be changed and alter the weight accordingly.

However, the speed of memory access, packet transmission and other resource accesses has increased dramatically since existing arbitration schemes were first put into use. In some circumstances, software simply cannot act fast enough to measure the demands of clients competing for a common resource and assign different arbitration weights. More generally, the software cannot operate fast enough to adjust the arbitration scheme or weights in accordance with the clients' temporal behavior.

For example, the software latency involved in measuring the memory bandwidth needs of multiple clients may be very large in comparison to the duration of a time period during which one or more of the clients' demands experience sharp decreases or increases. The inability of software to keep pace with the clients' behavior can result in consequences such as dropped packets, inefficient memory usage or allocation, and so on.

SUMMARY

In one embodiment of the invention, a method and apparatus are provided for implementing dynamic arbitration in hardware. In this embodiment, multiple communication streams or flows require access to a shared resource, such as memory, communication bandwidth, etc. A hardware arbiter monitors the streams' behavior and determines when one or more of their arbitration weights should be adjusted. When deemed necessary (e.g., a queue used by one of the streams is filled to a threshold level), the hardware reacts by quickly and dynamically modifying the weights according to the real-time demand for the resource.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a method and apparatus are provided for dynamically arbitrating, in hardware, multiple clients' requests for a shared resource. Because the clients' temporal behavior (e.g., frequency or rate of requests) is monitored in hardware, arbitration weights can be altered very rapidly to allow the arbitration scheme to meet their changing demands. Apparatuses according to embodiments of the invention may be implemented as, or within, network processors, network interface circuits, memory controllers, central processing units and/or other components.

An apparatus described herein may be particularly effective for arbitrating between multiple memory requesters, communication streams or flows, and/or other streams of requests for access to a shared resource, especially in an environment in which the streams' behaviors vary over time. For example, a given data stream may be intermittently bursty (e.g., characterized by numerous relatively small packets), but otherwise relatively quiescent. Another stream may require a high quality of service level only at certain times (e.g., when streaming multimedia data).

As used herein, the term client may refer to any entity requesting access to a shared resource, regardless of the type of access desired (e.g., write, read) and regardless of the type of data or requests submitted by the clients (e.g., packets, DMA requests).

Because an apparatus provided herein for dynamically arbitrating access to a shared resource is able to alter clients' arbitration weights rapidly, as their behavior dictates, without the overhead and latency involved in software-based schemes, negative consequences such as dropped packets, resource starvation and so on can be minimized or eliminated.

Figure 1:
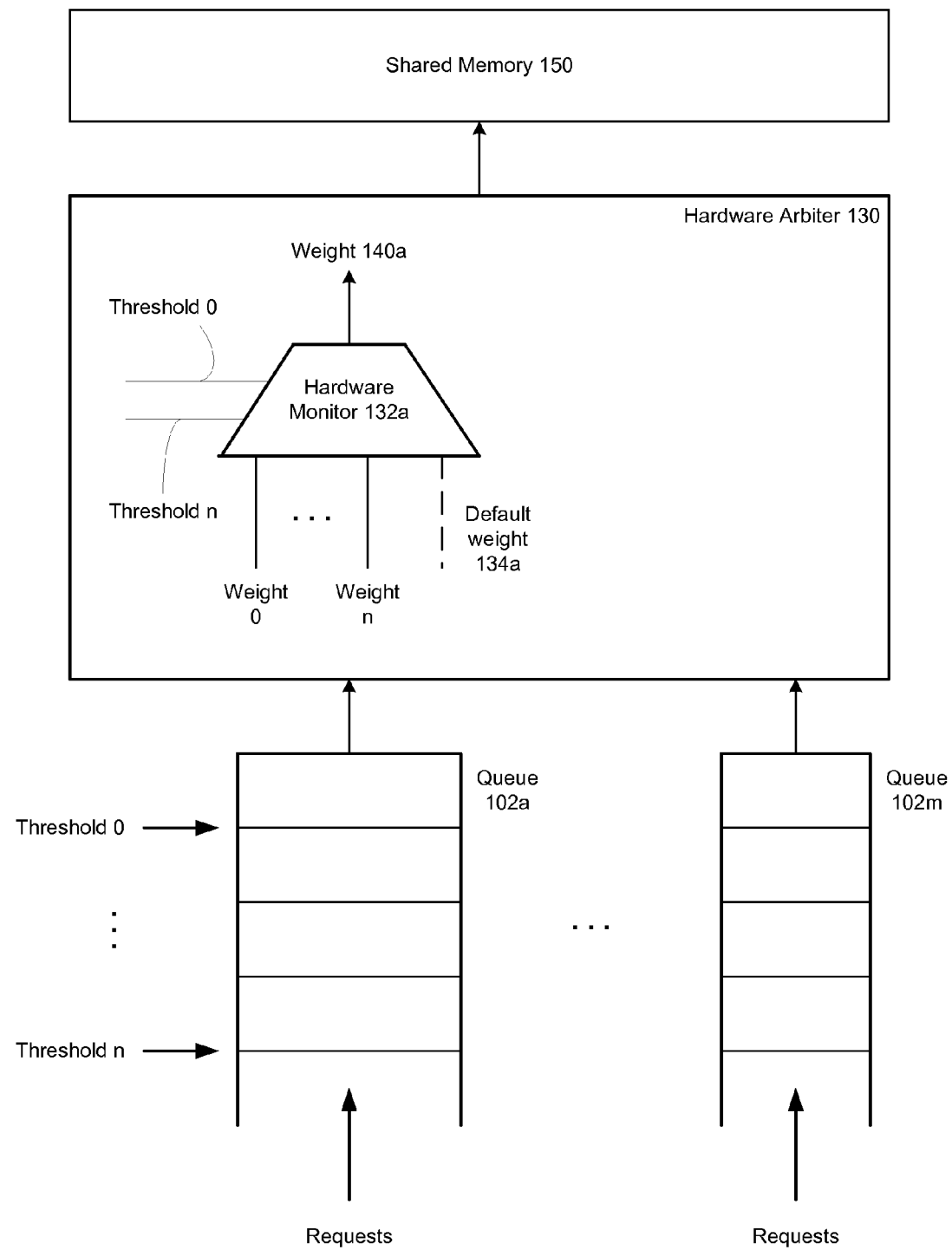
FIG. 1 is a block diagram depicting a hardware apparatus for dynamic arbitration, in accordance with an embodiment of the present invention.

FIG. 1 is a block diagram depicting a hardware apparatus for performing dynamic arbitration of service requests (e.g., memory access requests), according to one embodiment of the invention. In this embodiment, the apparatus comprises hardware arbiter 130, which arbitrates access to memory 150 among multiple clients.

Multiple FIFO hardware queues 102a-102m are employed to store requests from the clients. Each client's requests may be placed into a different queue. Any or all of the queues have associated thresholds, such as threshold 0 through threshold n for queue 132a, for identifying different levels of valid entries within the queue(s).

For each queue having defined thresholds, hardware arbiter 130 includes a monitor 132 for monitoring the queue's fullness. Priority encoding may be utilized to signal to the hardware monitor the highest threshold to which a queue is filled. Thus, if queue 102a is filled to threshold n, only threshold n need be signaled to hardware monitor 132a, not threshold 0 or other thresholds between threshold 0 and threshold n. As the level of entries in a queue decreases, lower thresholds will be signaled to the monitor. The hardware monitor thus acts as a multiplexer to produce an appropriate weight, based on which (if any) queue threshold is active.

As shown in FIG. 1, different thresholds may be communicated to a monitor via different signal lines. Or, as described below, a single select line may be used.

Based on the threshold signaled to hardware monitor 132a, the monitor outputs an appropriate arbitration weight 140a to be used in arbitrating between requests in queue 102a and requests in any other queue 102. In the illustrated embodiment of the invention, for each threshold defined for queue 102a a corresponding weight is set, and may be stored in a register or elsewhere. As the level of entries in queue 102a fluctuates based on the client's temporal behavior, different thresholds are signaled to hardware monitor 132a, and hence different weights are assigned to the corresponding clients' requests. Multiple thresholds may, however, be associated with a single weight.

In one implementation, a default weight (e.g., default weight 134a) may be assigned to or associated with a queue or client. In this implementation, the default weight is applied whenever the corresponding queue is not filled to or beyond an initial threshold (e.g., threshold 0 of queue 102a). In the apparatus of FIG. 1, a default weight may be determined or set according to the average bandwidth required by the corresponding client.

Using the weights output by the various queues' hardware monitors, and/or any static weights assigned to particular queues, hardware arbiter 130 may employ a round robin, deficit round robin, or other algorithm for servicing the clients' requests. Because a queue's fullness is substantially immediately signaled to the corresponding hardware monitor, a rapid influx of requests into a queue can be quickly met with a corresponding increase in the queue's arbitration weight. And, conversely, as requests are drained from a queue, its weight can be commensurately decreased.

Other criteria or characteristics may be considered in the dynamic adjustment of arbitration weights, in addition to or instead of threshold levels of fullness of the queues. For example, the types of data or requests being arbitrated may be considered, so that traffic requiring higher levels of QoS would receive higher weights. Similarly, the age of a queued request may be considered, or a client's identity, etc. This information may be signaled to the hardware arbiter and/or be used as additional input to a queue's hardware monitor.

Figure 2:
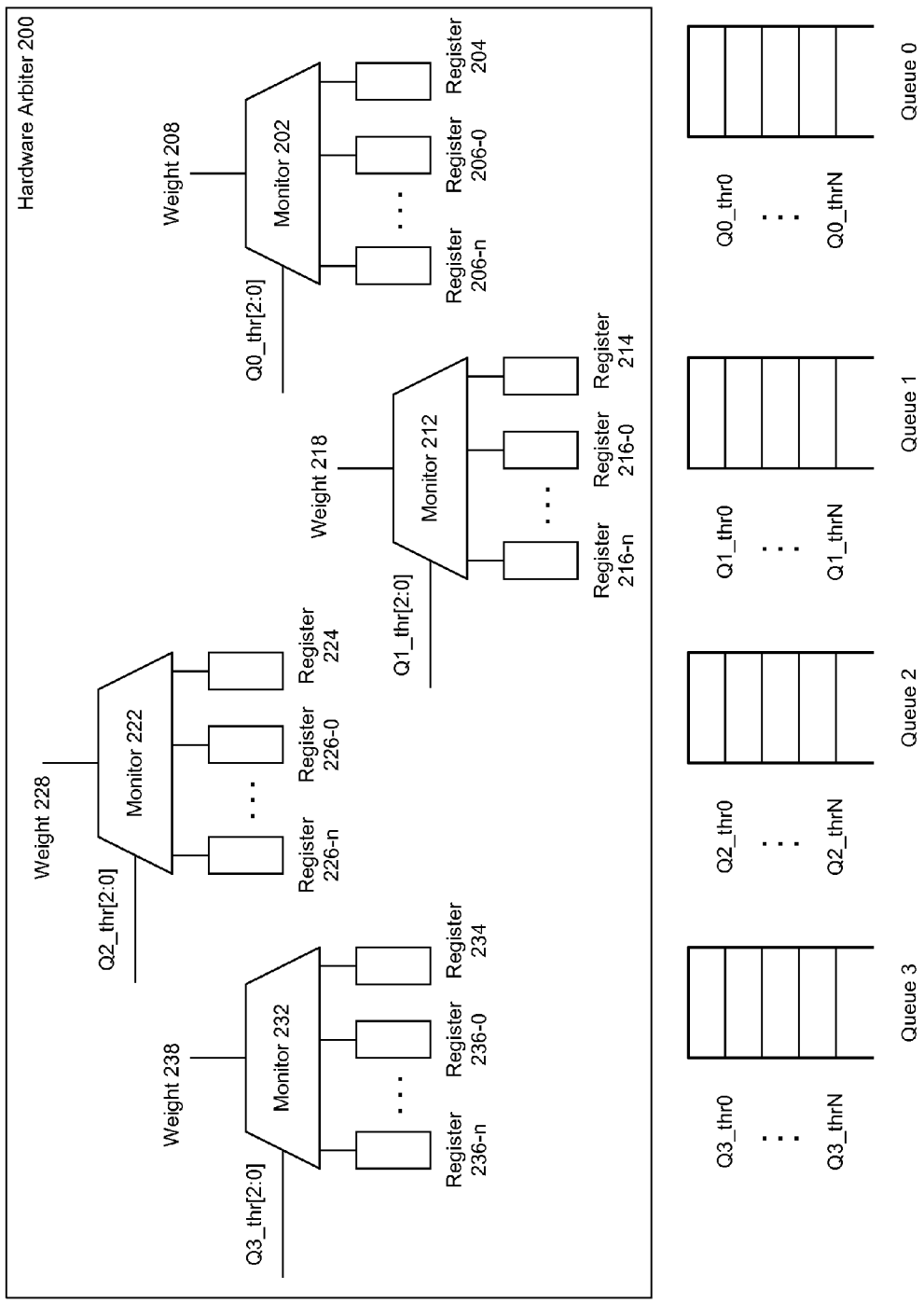
FIG. 2 is a block diagram of another hardware apparatus for dynamic arbitration, in accordance with an embodiment of the present invention.

FIG. 2 is a block diagram of another hardware apparatus for dynamically adjusting arbitration weights, according to an embodiment of the invention.

Hardware arbiter 200 of FIG. 2 arbitrates between four clients' data streams, with each client's data being queued separately. Illustratively, hardware arbiter 200 may be part of a network processor, wherein the bandwidth of a single memory device must be shared between all four clients' types of data accesses. For example, a client associated with queue 0 may be a network packet flow table controller for managing communication flows. Queue 1 may be associated with an XML symbol table controller for managing access to a symbol table used in the parsing of XML data. Queues 2 and 3 may be associated with other clients and data types, such as graphics data, modeling data, etc.

Hardware arbiter 200 comprises monitors 202, 212, 222 and 232 for monitoring queues 0, 1, 2 and 3, respectively. Each queue has n thresholds ($n \geq 1$), and a signal line (e.g., Q0_thr for queue 0) is used to signal to the queue's monitor when the queue is filled to or beyond a threshold. In this embodiment of the invention, the threshold signal line is 3 bits wide, allowing 8 different thresholds to be signaled. In other embodiments, different numbers of thresholds may be monitored; in particular, different numbers of thresholds may be defined for different queues (i.e., they need not all have the same number of thresholds).

Each monitor is configured to output an arbitration weight to be used by arbiter 200 to arbitrate between the clients' queued access requests. Thus, monitor 202 outputs weight 208 for queue 0, monitor 212 outputs weight 218 for queue 1, monitor 222 outputs weight 228 for queue 2 and monitor 232 outputs weight 238 for queue 3.

For each queue, a default arbitration weight is stored in a register coupled to the queue's monitor. In particular, registers 204, 214, 224 and 234 store default or base weights for queue 0, queue 1, queue 2 and queue 3, respectively. Each monitor may continue to output the corresponding default arbitration weight as the current arbitration weight as long as the queue's threshold signal indicates that no threshold level of entries has yet been reached in the queue.

However, when a threshold is reached within one of the queues, the threshold is identified to the queue's monitor, and an arbitration weight is read from a different register. More specifically, each monitor is coupled to an additional register for each defined queue threshold, such as registers 236-0 through 236-$n$ for queue 3 and monitor 232. When a new threshold is identified across the threshold signal line, the monitor begins to output the arbitration weight read from the corresponding register as the new current arbitration weight. Therefore, the queue's weight can change very rapidly in response to its temporal behavior, without relying upon any software intervention.

In an embodiment of the invention, a monitor may be defined to include the illustrated multiplexers and the registers that output arbitration weights corresponding to the queue thresholds that are signaled to the monitor. In another embodiment of the invention, a monitor may be considered to also comprise the control logic that generates the threshold levels for client queues, and the select lines that signal the thresholds to the multiplexers. In other embodiments, a monitor may be defined differently.

As described above, an arbitration polynomial employed by the hardware monitor(s) may consider additional information in addition to (or perhaps instead of) queue thresholds.

Figure 3:
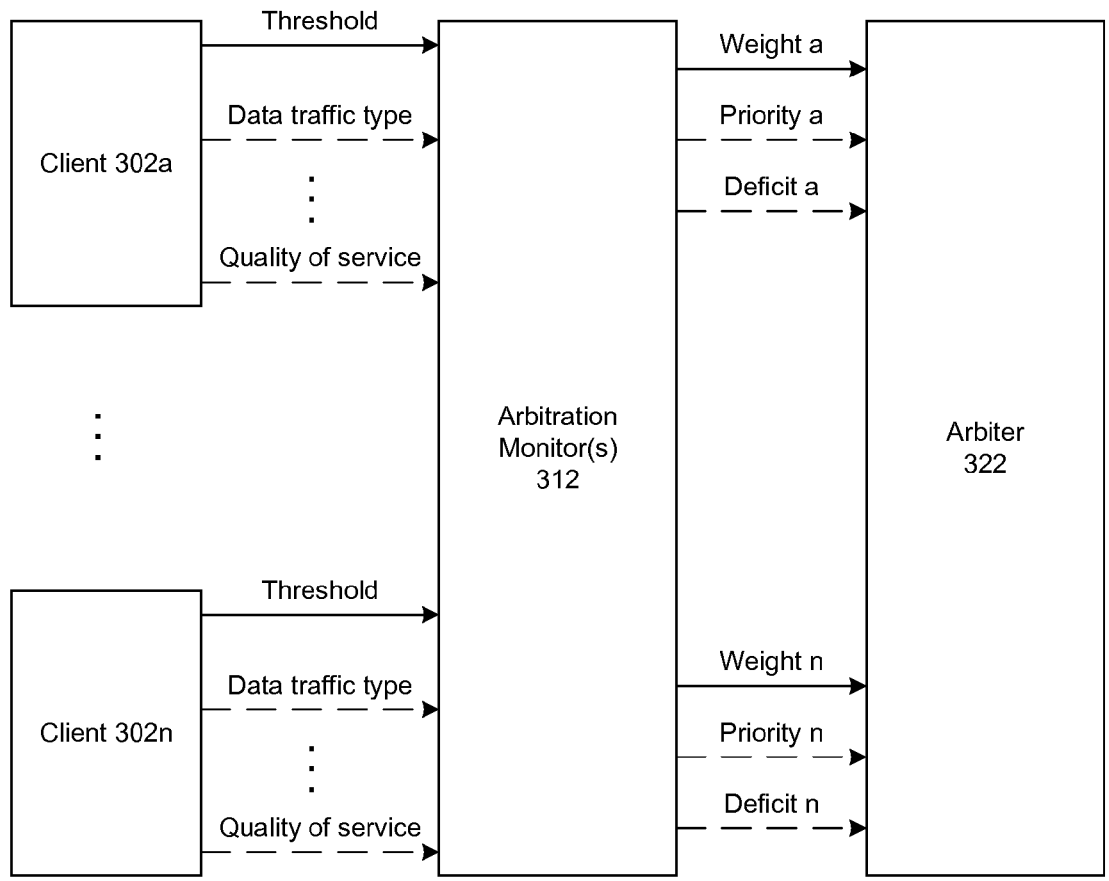
FIG. 3 illustrates the use of various types of client information during dynamic hardware arbitration, in accordance with an embodiment of the invention.

FIG. 3 illustrates this concept, wherein a plurality of clients 302a-302n requires access to a shared resource. For any or all of the clients, information such as queue thresholds, traffic type, quality of service, number of available credits, number of available descriptors, and so on, is provided as input to arbitration monitor(s) 312. As indicated in FIGS. 1 and 2, separate monitors may be implemented for each client queue. The monitor(s) apply an arbitration polynomial to translate the various input into data for arbiter 322 to use in arbitrating among the clients' requests, or to compute such data from the input.

Illustratively, the arbiter may receive as input for a given client a weight (e.g., determined as described above with relation to FIGS. 1 and 2), a priority reflecting the client's type of traffic, quality of service or other characteristic, a deficit (e.g., if the arbiter is applying a deficit round robin algorithm), etc.

Figure 4:
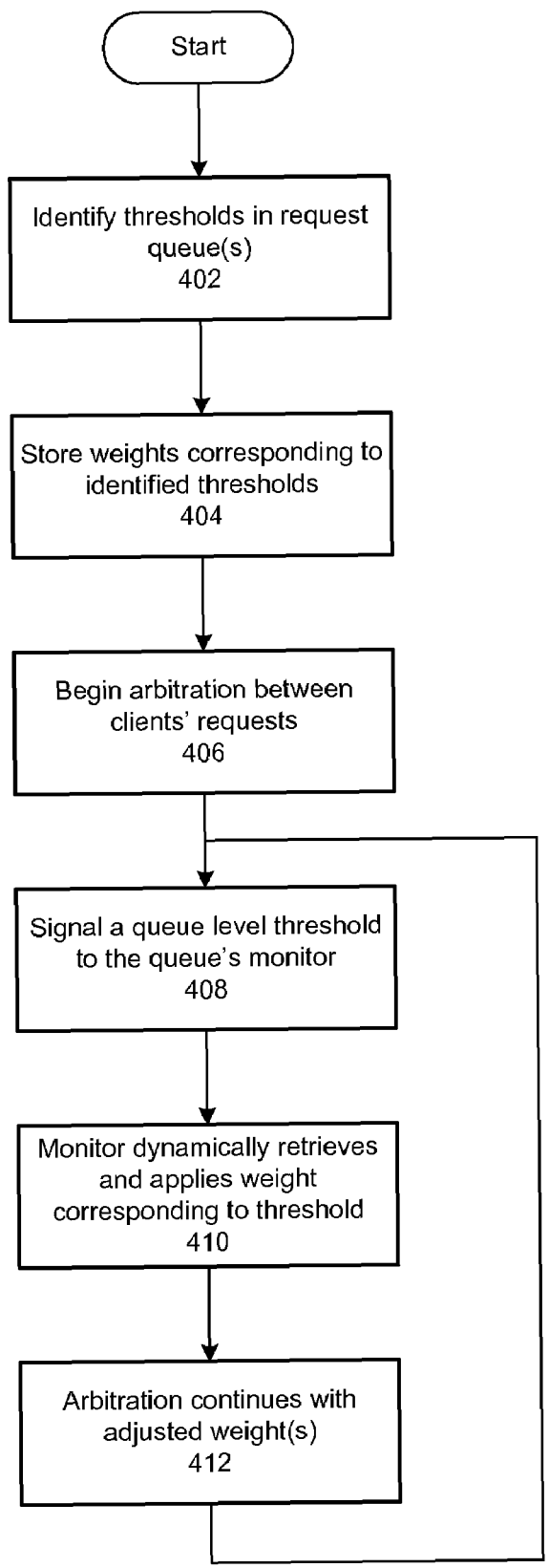
FIG. 4 is a flowchart illustrating one method of performing dynamic arbitration in hardware, in accordance with an embodiment of the invention.

FIG. 4 is a flowchart demonstrating a method of performing dynamic arbitration in hardware, according to one embodiment of the invention. In this embodiment, a hardware arbiter may arbitrate among memory requests, communication streams awaiting transmission, or virtually any other type of competing requests for a resource.

In operation 402, a number of thresholds (e.g., one or more) are identified in one or more FIFO queues that will be used to store clients' requests for the resource. The thresholds may be configured to reflect queue levels that are believed to correspond to unusual numbers of requests, such that a change in the arbitration scheme is needed to accommodate the requests.

For example, an initial threshold for a given queue may correspond to some level of entries beyond an average number. Thus, if the queue averages X entries during periods of normal traffic, an initial threshold may mark a number of entries beyond X (e.g., twice X). Additional thresholds may be configured to reflect the need for increasingly more attention to the queue, by the arbiter, as the queue continues to fill.

In operation 404, for some or all of the thresholds defined for a queue, corresponding arbitration weights are stored (e.g., in registers). A default weight for the queue, when no thresholds are met, may also be stored. These values will be read and applied as the current arbitration weight during execution of the arbitration algorithm. In one implementation of this embodiment of the invention, each time a higher queue threshold is reached, an arbitration weight twice that of the previous weight is applied.

In operation 406, the hardware arbiter operates to arbitrate among the clients' requests as those requests arrive in the clients' corresponding queues. Initially, default weights may be assigned, which may be unique to each queue or client (e.g., different queues/clients may have different default weights), or a single default weight may be assigned to all queues/clients.

In operation 408, the number of entries within a queue reaches an initial or new threshold (i.e., a threshold higher or lower than a threshold previously encountered in that queue). That threshold is signaled to a monitor for the queue.

In operation 410, the monitor receives the threshold signal, reads or retrieves a weight associated with that threshold, and outputs that weight as the new arbitration weight for the queue.

In operation 412, arbitration continues, with the adjusted arbitration weight for the queue.

Operations 408 through 412 may then repeat as necessary to adjust the queues' arbitration weights based on their clients' temporal behavior. As the number of entries in a queue rises, the queue may be granted higher weights, and as the number of entries falls, its arbitration weight will also fall.

In one alternative embodiment of the invention, a single monitor may simultaneously monitor multiple queues and dynamically adjust their weights as needed. For example, a single monitor may comprise sub-monitors for monitoring individual queues and forwarding information regarding those queues (e.g., suggested arbitration weight, current threshold, priority) for use in setting weights for all the queues. Or, a single monitor may receive input regarding the status of multiple queues (e.g., what threshold levels they are filled to), and logically combine those statuses to select a set of arbitration weights to apply to the queues.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof.

In particular, methods described herein may be implemented using data structures and program code residing on a suitable computer-readable medium, which may be any device or medium that can store data and/or code for use by a computer system. This includes, but is not limited to, volatile memory, non-volatile memory, magnetic and optical storage devices such as disk drives, magnetic tapes, CDs (compact discs), DVDs (digital versatile discs or digital video discs), or other media capable of storing computer-readable media now known or later developed.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A hardware apparatus for arbitrating requests for a computer resource and dynamically adjusting arbitration weights, the apparatus comprising:
   a plurality of queues, wherein each said queue is associated with a client requiring access to the resource and is configured to store requests for the resource from the associated client;
   within each said queue, one or more identified thresholds that are associated with one or more levels of queue fullness; and
   a monitor configured to output an arbitration weight for controlling access to the computer resource based on execution of an arbitration polynomial for which inputs include: said thresholds, a quality of service associated with requests in the queues, a type of traffic associated with requests in the queues, a number of available credits for the clients associated with the queues, and a number of available descriptors for the clients associated with the queues.

2. The hardware apparatus of claim 1, further comprising:
   for each said queue, a corresponding monitor configured to retrieve an arbitration weight corresponding to a threshold identified in said queue.

3. The hardware apparatus of claim 2, further comprising:
   a threshold signal line coupling each said queue to said corresponding monitor.

4. The hardware apparatus of claim 2, further comprising:
   for each said queue, a set of registers coupled to said corresponding monitor for storing the arbitration weights.

5. The hardware apparatus of claim 1, further comprising an arbiter, wherein output from the arbitration polynomial to the arbiter includes one or more of:
   the arbitration weight corresponding to the threshold in the given queue to which the given queue is filled;
   a priority associated with the given queue; and
   if the arbiter arbitrates using a deficit round robin algorithm, a deficit associated with the given queue.

6. The hardware apparatus of claim 1, further comprising:
   for one or more of the clients, a default weight to be assigned to requests from the client for the resource when the queue associated with the client is not filled to an identified threshold.

7. The hardware apparatus of claim 1, wherein the apparatus comprises a network interface circuit.

8. The hardware apparatus of claim 1, wherein the apparatus comprises a network processor.

9. The hardware apparatus of claim 1, wherein the apparatus comprises a memory controller.

10. A method of dynamically arbitrating, in hardware, among requests for a shared resource, the method comprising:
 operating multiple hardware queues, wherein each said queue is associated with a consumer of the shared resource and is configured to store requests for the shared resource from the associated consumer;
 monitoring levels of fullness of the queues using one or more thresholds identified in each queue, wherein each threshold is associated with one or more levels of queue fullness; and
 if a level of fullness of one of the queues reaches a threshold, assigning to requests for the shared resource from the associated consumer an arbitration weight different from an arbitration weight assigned to said requests before the level of fullness reached said threshold, wherein the assigned arbitration weight depends on execution of an arbitration polynomial for which inputs include: said at least one threshold, a quality of service associated with requests in the queues, a type of traffic associated with requests in the queues, a number of available credits for the clients associated with the queues, and a number of available descriptors for the clients associated with the queues.

11. The method of claim 10, further comprising:
 for each consumer, applying a base arbitration weight to requests for the shared resource from the consumer as long as the queue associated with the consumer is not filled to a threshold identified in the queue.

12. The method of claim 10, wherein said monitoring comprises:
 receiving from a first queue a signal configured to indicate that the first queue is filled to a first threshold.

13. The method of claim 10, further comprising outputting from the arbitration polynomial one or more of:
 said assigned arbitration weight;
 a priority assigned to a queue; and
 a deficit assigned to a queue, for use in a deficit round robin arbitration algorithm.

14. A method of dynamically adjusting arbitration among requests for a shared resource according to the temporal behavior of clients issuing the requests, the method comprising:
 operating a hardware arbiter to arbitrate among requests for the resource received from multiple clients, wherein each client's requests are assigned a default arbitration weight for determining how to allocate the resource to the clients' requests;
 queuing requests for the resource from the clients in different hardware queues;
 generating threshold signals from the queues to the arbiter as the levels to which the queues are filled with requests for the resource fluctuate between predetermined thresholds; and
 adjusting the arbitration weights assigned to the clients' requests in response to the threshold signals, wherein the adjusted arbitration weights are based execution of an arbitration polynomial for which inputs include: said threshold signals, a quality of service associated with requests in the queues, a type of traffic associated with requests in the queues, a number of available credits for the clients associated with the queues, and a number of available descriptors for the clients associated with the queues.

15. A computer readable medium storing instructions that, when executed by a computer, cause the computer to perform a method of dynamically adjusting arbitration among requests for a shared resource according to the temporal behavior of clients issuing the requests, the method comprising:
 operating a hardware arbiter to arbitrate among requests for the resource received from multiple clients, wherein each client's requests are assigned a default arbitration weight for determining how to allocate the resource to the clients' requests;
 queuing requests for the resource from the clients in different hardware queues;
 generating threshold signals from the queues to the arbiter as the levels to which the queues are filled with requests for the resource fluctuate between predetermined thresholds; and
 adjusting the arbitration weights assigned to the clients' requests in response to the threshold signals, wherein the adjusted arbitration weights are based execution of an arbitration polynomial for which inputs include: said threshold signals, a quality of service associated with requests in the queues, a type of traffic associated with requests in the queues, a number of available credits for the clients associated with the queues, and a number of available descriptors for the clients associated with the queues.

* * * * *